United States Patent [19]
Schmitt et al.

[11] 3,778,606
[45] Dec. 11, 1973

[54] CONTINUOUSLY UPDATING FOURIER COEFFICIENTS EVERY SAMPLING INTERVAL

[75] Inventors: Joseph W. Schmitt, Hudson; Donald L. Starkey, Amherst, both of N.H.

[73] Assignee: Sanders Associates, Inc., Nashua, N.H.

[22] Filed: Feb. 23, 1972

[21] Appl. No.: 228,545

[52] U.S. Cl................. 235/156, 235/183, 324/77 B
[51] Int. Cl........................................... G06f 15/34
[58] Field of Search........................... 235/156, 181; 324/77 B, 77 G, 77 H

[56] References Cited
UNITED STATES PATENTS

| | | | |
|---|---|---|---|
| 3,344,349 | 9/1967 | Schroeder | 324/77 H |
| 3,586,843 | 6/1971 | Sloane | 235/156 |
| 3,636,333 | 1/1972 | Klund | 235/156 |

*Primary Examiner*—Felix D. Gruber
*Assistant Examiner*—David H. Malzahn
*Attorney*—Louis Etlinger

[57] ABSTRACT

A method and apparatus for continually producing updated Fourier coefficient values of an input signal during each sample time. The Fourier coefficient $F(k\Omega)$ is first calculated for any sequence of N samples of the input signal $f(zT)$. To calculate the Fourier coefficients for the next ensuing sample time, the previously calculated Fourier coefficient value is updated by the addition of the product of the reference value and the difference between the new sample and the sample which occurred N samples earlier in time. This process is continued for each new sample.

4 Claims, 4 Drawing Figures

CONTINUOUSLY UPDATING FOURIER COEFFICIENTS EVERY SAMPLING INTERVAL

BACKGROUND OF INVENTION

A. Field of Invention

This invention relates to a new and improved method and apparatus for processing digital signals and in particular to a method and apparatus for computing the Fourier coefficient values for the discrete Fourier transform of a sequence of signal samples $f(nt)$.

The discrete Fourier transform (DFT) is an algorithm which correlates an unknown signal with a known reference signal over a fixed period of time. The DFT can be employed for various signal processing functions, such as signal filtering, correlations, convolution computations, spectral analysis, and the like. These signal processing functions have utility in such fields as communications, seismology, sonar, radar and others.

B. Prior Art

The Fourier transform, or spectrum, of an analog signal is given by $$F(w) = \int_{-\infty}^{\infty} f(t) e^{-jwt} dt, \quad (1)$$

where $f(t)$ and $F(w)$ may be complex functions of a real variable. In digital signal processing, the signal $f(t)$ is represented by a sequence of N samples $f(nT)$, where T is the sampling interval in the time domain and for $0 \leq n \leq N-1$. Similarly the spectrum, $F(w)$ is represented by $F(k\Omega)$, where $\Omega$ is the chosen increment between samples in the frequency domain and $k$ is an integer for $k\Omega \leq 1/zNT$. The discrete Fourier transform (DFT) of the sequence of samples $f(nT)$ is then defined as $$F(k\Omega) = \sum_{n=0}^{N-1} f(nT) e^{-jk\Omega nT} \quad (2)$$

In prior art DFT computational methods, the Fourier coefficient values are valid only once (at the end) during each integration interval $\tau$, where $\tau = NT$. Because of this, prior art DFT techniques have been generally unsatisfactory for analyzing the spectral characteristics and/or changes in an input signal with a rather fine degree of resolution, for example, frequency spacings on the order of 0.01 Hertz or smaller. Generally, higher resolution means larger integration interval $\tau$ and larger output signal sample spacings. One approach to this problem is to employ time overlapping integration intervals for different DFT multiplying and integrating channels. This solution is rather costly since separate multiplying and integrating networks must be provided in each channel.

BRIEF SUMMARY OF THE INVENTION

An object of this invention is to provide novel and improved digital signal processing apparatus.

Another object is to provide novel and improved Fourier coefficient calculating apparatus.

Still another object is to provide novel and improved digital signal processing apparatus which provides a valid updated Fourier coefficient value for each sample of the signal being evaluated.

Yet another object is to provide a novel and improved method of providing an updated Fourier coefficient value for each sample of the signal being evaluated.

In brief, the method and apparatus embodying the invention compute the Fourier coefficient $F(k\Omega)$ of a stream of signal samples $f(zT)$ where T is the sampling interval in the time domain and $-\infty \leq z \leq \infty$. The $f(zT)$ signal samples are delayed for an interval NT, where N is the number of signal samples in the integration interval $\tau$ of the discrete Fourier transform of any sequence $f(nT)$ of the $f(zT)$ samples, where $z \leq n \leq z+N-1$. In the method, the differences are taken between samples which are NT apart in time so as to provide a sequence of difference values. The sequence of difference values is then multiplied by a sequence of complex reference values $R(k\Omega zT)$ for at least one value of $k$ so as to produce a resulting sequence of products. The products are then accumulated so as to provide an updated Fourier coefficient value for each value of $z$.

In apparatus embodying the invention, a storage means is provided to delay the $f(nT)$ signal samples for an integration interval $\tau$. An arithmetic means is coupled to receive the signal samples $f(nT)$ and the delayed version thereof from the storage means and is arranged to perform the difference taking, multiplying and accumulating operations as described above.

BRIEF DESCRIPTION OF DRAWINGS

In the accompanying drawings like reference characters denote like elements of structure.

DESCRIPTION OF PREFERRED EMBODIMENT

Equation 2 defines the DFT, $F(k\Omega)$, for the sequence of signal samples $f(nT)$ which are taken from an analog or continuous signal $f(t)$. Although the signal $f(t)$ can be any function of time, it is illustrated, by way of example, by the dashed waveform $f(t)$ in FIG. 1 to be a burst of a sinusoidal wave which has a duration of one and one half cycles. The signal samples $f(nT)$ are taken at equally spaced time intervals T in the time domain for values of $0 \leq n \leq N-1$, where N is the number of samples taken during each integration interval $\tau$. The discrete Fourier transform $F(k\Omega)$ of the sequence of samples $f(nT)$ is given by equation (2).

In the general case, the sample sequence $f(nT)$ is a sequence of complex signal samples of the form $$f(nT) = A(nT) + jB(nT) \quad (3)$$

The complex reference samples $e^{-jk\Omega nT}$ can be rewritten in the form $$R(kn\Omega T) = e^{-jk\Omega nT} = \cos k\Omega nT + j \sin k\Omega nT$$

(4)

By substitution of equations (3) and (4), equation (2) can be rewritten as $$F(k\Omega) = \sum_{n=0}^{N-1} [A(nT) + jB(nT)][\cos k\Omega nT + j \sin k\Omega nT]$$

(5)

The resulting Fourier coefficient $F(k\Omega)$ is a complex value and can be rewritten in the form of a real part $F_R(k\Omega)$ given by $$F_R(k\Omega) = \sum_{n=0}^{N-1} A(nT)\cos k\Omega nT - B(nT)\sin k\Omega nT$$

(6)

and of an imaginary part $F_I(k\Omega)$ given by $$F_I(k\Omega) = \sum_{n=0}^{N-1} A(nT)\sin k\Omega nT + B(nT)\cos k\Omega nT$$

(7)

The complex coefficient is thus given by $$F(k\Omega) = F_R(k\Omega) + j F_I(k\Omega)$$

(8)

and the voltage magnitude of the spectrum is given by $$|F(k\Omega)| = \sqrt{F_R^2(k\Omega) + F_I^2(k\Omega)}$$

(9)

Figure 1:
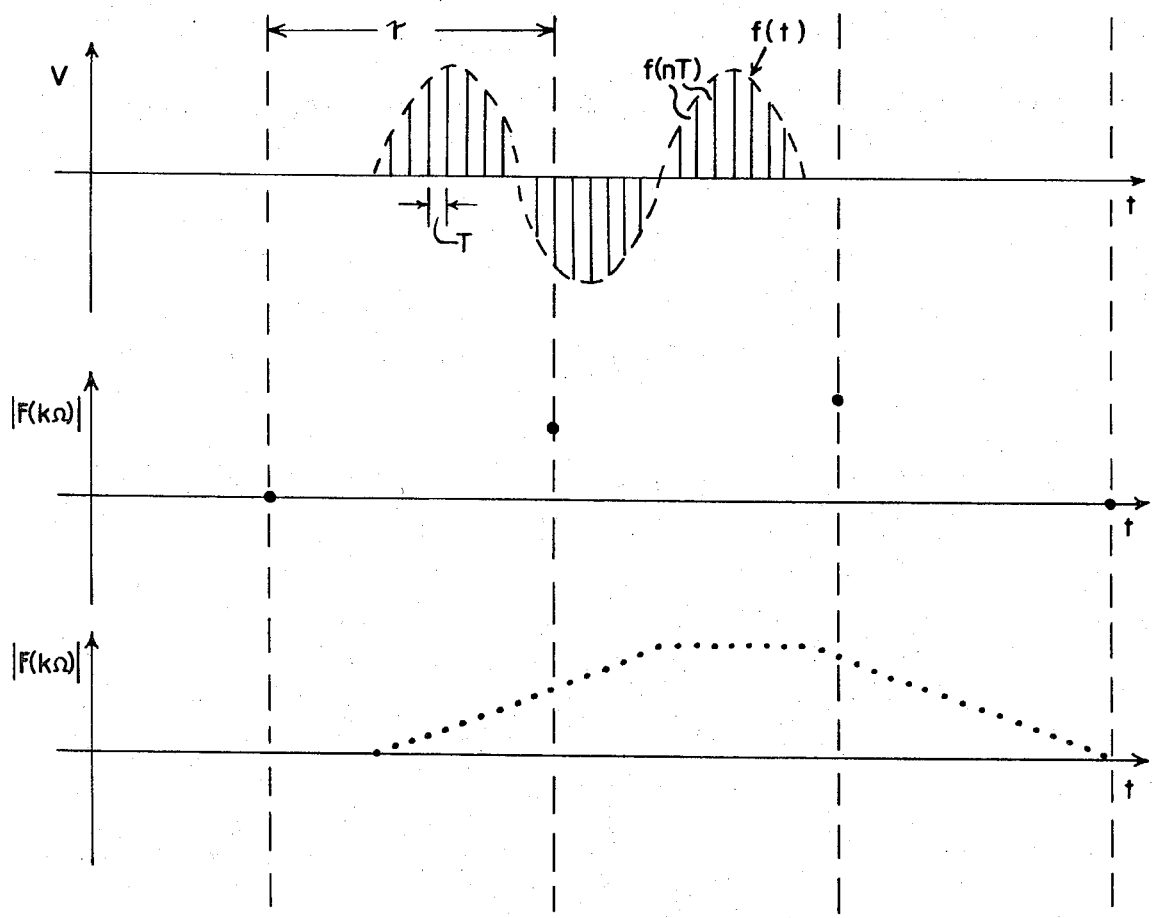
FIG. 1 is a waveform diagram including a voltage waveform graph of an exemplary signal of which it is desired to compute the Fourier coefficients and voltage versus time graphs which show the number of points obtainable from prior art discrete Fourier transform apparatus and from discrete Fourier transform apparatus embodying the present invention.

It can be seen from equations (2) and (5) that a Fourier coefficient $F(k\Omega)$ can be obtained by multiplying the complex input sample $f(nT)$ times the complex reference samples $R(kn\Omega T)$ and integrating the products over N samples corresponding to an integration interval $\tau = NT$. In the typical prior art DFT apparatus, each complex input sample $f(nT)$ is multiplied in a complex multiplier by a complex reference sample $R(kn\Omega T)$ provided by reference generator. The output of the complex multiplier is added to the previous sum in a digital integrator module. The sum is stored in a digital shift register between input samples. After the summation of N samples (the end of the integration interval $\tau$), a dump command is activated so as to transfer the sum from the shift register to an output utilization device as the Fourier coefficient. The dump command also serves to reset the integrator and the storage register such that a new sequence of signal samples $F(nT)$ may be evaluated during the next integration interval. Accordingly, the Fourier coefficient value $F(k\Omega)$ is valid only at the end of each integration interval $\tau$. As shown in FIG. 1, this results in only two non-zero values or points for the voltage magnitude spectrum of $f(nT)$. It is to be noted that all three graphs in FIG. 1 have a common time scale.

As pointed out previously, prior art attempts to achieve more Fourier coefficient values per unit time have employed time overlapping integration intervals with separate multiplying additions and integration networks for each such interval. That is, the DFT integral was separately performed for all $f(nT)$ samples in each integration interval.

The method and apparatus which embody the present invention avoid all of these separate DFT computations for time overlapping integration intervals. It has been discovered that once the DFT integration has been performed over an integration interval $\tau$, the integration sum need only be updated to calculate the DFT for the next adjacent integration interval which is advanced by one sample time (T seconds). The updating operation need only consider the new signal sample gained and the old signal sample lost by sliding or advancing the integration interval by one sample time. In effect, the product of the old sample and the reference value is subtracted from and the product of the new sample and reference value is added to the previously calculated DFT integration sum during each sample time. This results in a valid Fourier coefficient value during each sample time as shown by the voltage magnitude spectrum graph of $/F(k\Omega)/$ in FIG. 1.

Consider that the entire stream of signal samples is given by $f(zT)$, $-\infty \leq z \leq \infty$. Consider also that the discrete Fourier transform summation can take place over any sequence of N samples of the input signal $f(zT)$. That is, the integration begins at any arbitrary value of $z$ and continues to $z + N-1$, where $z \leq n \leq z + N-1$. Accordingly, the discrete Fourier transform at a frequency of $(k\Omega)$ and at a sample time of $(z+N-1)T$ is given by:

$$F[(k\Omega), (z+N-1)T] = \sum_{n=z}^{z+N-1} f(nT)e^{-jk\Omega nT}$$

(10)

For the next adjacent integration interval which is advanced in time by one sample, the DFT is given by:

$$F[(k\Omega), (z+N)T] = \sum_{n=z+1}^{z+N} f(nT)e^{-jk\Omega nT}$$

(11)

The integration sum of equation (10) includes the lost product $f(zT)e^{-jk\Omega zT}$ whereas the integration sum of equation (11) does not. On the other hand, the integration sum of equation 11 includes the gained product $f[(z+N)T]e^{-jk\Omega(z+N)T}$ whereas equation (10) does not. Accordingly the integration sum of equation (11) is essentially equation (10) minus the lost product and plus the gained product and can be rewritten as $$F[(k\Omega), (z+N)T] = [F[(k\Omega), (z+N-1)T]]$$
$$-f(zT)e^{-jk\Omega zT} + f(z+N)T)e^{-jk\Omega(z+N)T}$$

(12)

For a reference signal which is periodic in the integration interval $\tau$, $e^{-jk\Omega zT} = e^{-jk\Omega(z+N)T}$.
Equation (12) then becomes:

$$F[(k\Omega), (z+N)T] = [F[(k\Omega), (z+N-1)T]]$$
$$+ [f((z+N)T) - f(zT)]e^{-jk\Omega zT}$$

(13)

In the practice of the present invention, the left hand term $F[(k\Omega), (z+N-1)T]$ of equation (13) is first calculated during a set up or initializing period. This requires an initial delay of N samples or one Fourier integration interval $\tau$. This Fourier coefficient $F[(k\Omega), (z+N-1)T]$ is then saved or stored so that it can be updated during the next ensuing sample time by the addition of the right hand term of equation (13). This updated Fourier coefficient value is in turn saved for the next sample time when it is also updated in accordance with equation (13), and so on. In particular during each sample time, the difference is taken between the samples $f(z+N)T$ and $f(zT)$, which samples are NT apart in time so as to provide a sequence of difference values, one for each sample time. This sequence of difference values is multiplied by a corresponding sequence of complex reference values $R(k\Omega zT) = e^{-jk\Omega zT}$ for at least one value of $k$ to produce a resulting sequence of products. The products are accumulated from one sample time to another so as to provide an updated Fourier coefficient value for each value of $z$.

Figure 2:
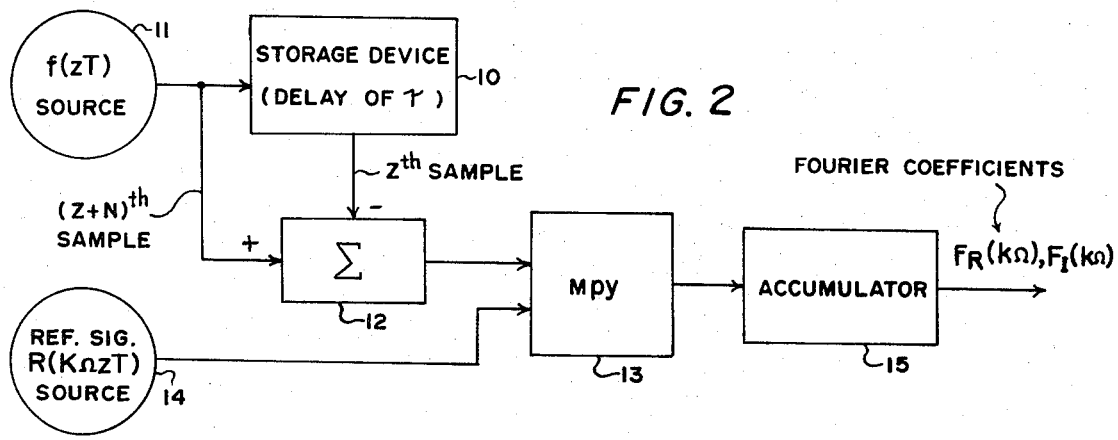
FIG. 2 is a block diagram of discrete Fourier transform apparatus embodying the present invention.

With reference now to FIG. 2, discrete Fourier transform apparatus embodying the invention includes a storage device 10 which delays the sampled signal $f(zT)$ provided by a signal source 11 for one Fourier integration interval $\tau = NT$. For example, the storage device 10 may suitably be a digital shift register which is clocked or advanced at the sample rate. The $f(zT)$ source 11 may assume any suitable form which provides a sampled data signal $f(zT)$ which may or may not be of a complex form $f(zT) = A(zT) + jB(zT)$.

An arithmetic means includes an algebraic addition network 12 and a multiplication network 13. The addition network 12 receives the $z^{th}$ sample from the output of the storage device 10 and $(z+N)^{th}$ sample from the output of the $f(zT)$ source 11 and takes the difference therebetween to provide at its output the difference value $f[(z+N)T] - f(zT)$. The multiplier 13 multiplies this difference value by the reference value $R(k\Omega zT)$ as provided by reference signal source 14. This product value at the output of multiplier 13 then corresponds to the right hand term of equation (13). The product values which occur at the output of multiplier 13 are accumulated in an accumulator 15.

During the initializing or setup period of the discrete Fourier transform apparatus, the Fourier coefficient $F[(k\Omega), (z+N-1)T]$ as given by equation (10) is calculated. When the discrete Fourier transform apparatus is first turned on, The accumulator 15 and the storage device 10 are cleared to an initial condition such as an all zeroes state. As a result, the output of the storage device 10 will be all zeroes for the N sample times. Accordingly, the algebraic addition network 12 will pass the first N samples from the $f(zT)$ source in an unaltered form to the multiplier 13 where they will be multiplied by the corresponding first N reference values $R(k\Omega zT)$. These first N products essentially correspond to the individual product terms in equation (10) and are accumulated by the accumulator 15 so as to provide at the end of the N sample sequence the Fourier coefficient $F[(k\Omega), (z+N-1)T]$. During each successive sample time thereafter, the accumulated product value is updated by the output products of the multiplier 13 so as to provide an updated Fourier coefficient value in accordance with equation 13.

Figure 3:
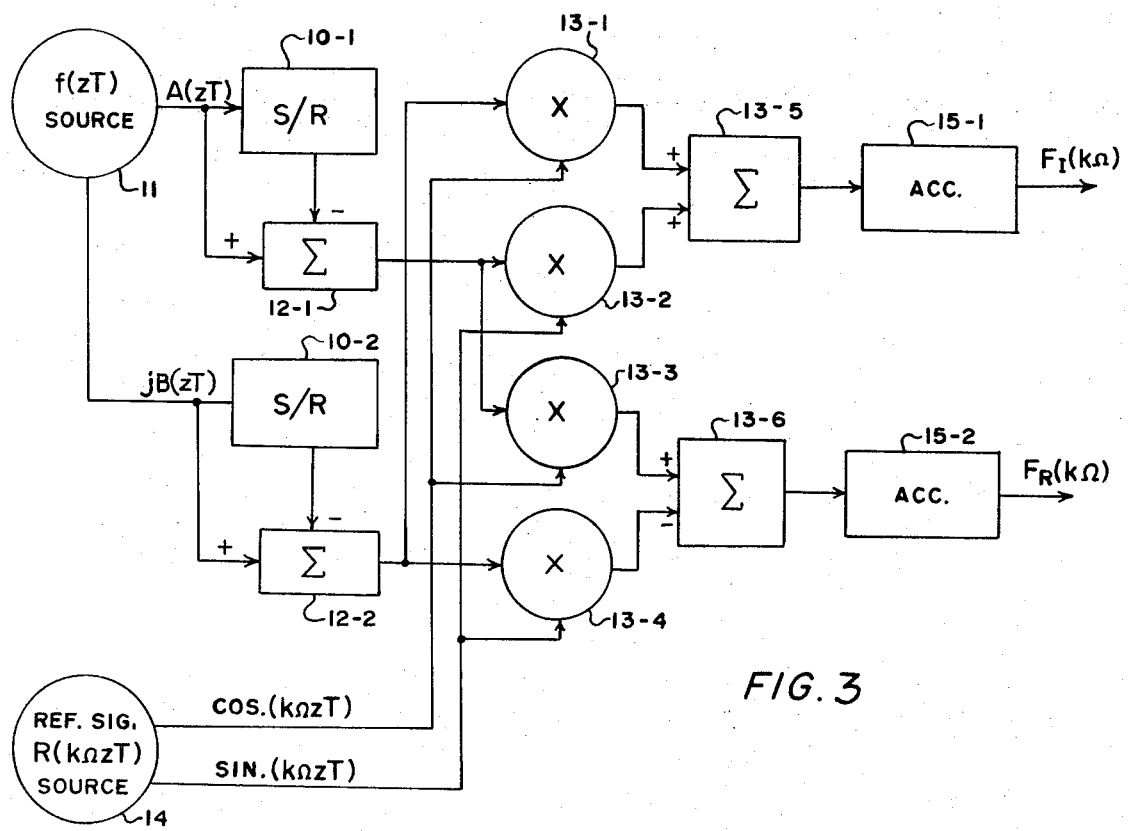
FIG. 3 is a more detailed block diagram of discrete Fourier transform apparatus embodying the present invention.

FIG. 3 shows a more detailed block diagram of discrete Fourier transform apparatus embodying the invention for the case of a complex input signal of the form $f(zT) = A(zT) + jB(zT)$. Thus, the shift register 10-1 and a linear algebraic addition network 12-1 are provided for the real part $A(zT)$ of the signal and another shift register 10-2 and another algebraic addition network 12-2 are provided for the imaginary part $B(zT)$ of the signal. The multiplier network 13 includes multiplying circuits 13-1 through 13-4 and algebraic addition networks 13-5 and 13-6. The reference signal source 14 provides the complex reference values $\cos(k\Omega zT)$ and $\sin(k\Omega zT)$, where $e^{-jk\Omega zT} = \cos(k\Omega zT) + j\sin(k\Omega zT)$. The sequence of difference values at the output of the addition network 12-1 are multiplied in the multipliers 13-2 and 13-3 by the $\sin(k\Omega zT)$ and $\cos(k\Omega zT)$ values, respectively. On the other hand, the sequence of difference values at the output of the addition network 12-2 are multiplied in the multiplier 13-1 and 13-4 by the $\cos(k\Omega zT)$ and $\sin(k\Omega zT)$ values, respectively. The addition network 13-5 performs an addition operation upon the outputs of the multipliers 13-1 and 13-2. In contrast thereto, the addition network 13-6 takes the difference between the outputs of the multipliers 13-3 and 13-4. The outputs of the addition network 13-5 are accumulated in the accumulator 15-1 so as to provide at its output the imaginary part of the Fourier coefficient $F_I(k\Omega)$. On the other hand, the accumulator 15-2 serves to accumulate the outputs of the addition network 13-6 so as to provide the real part $F_R(k\Omega)$ of the Fourier coefficient.

Figure 4:
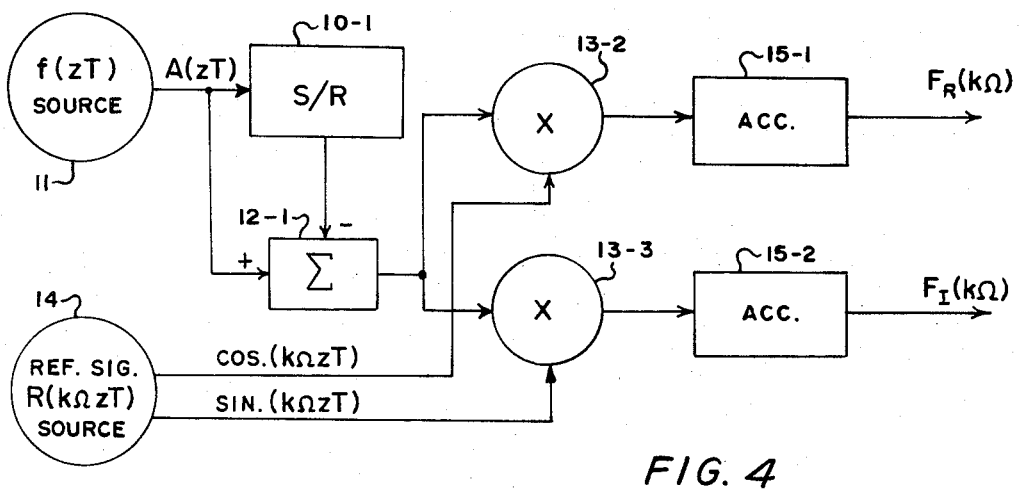
FIG. 4 is a block diagram of discrete Fourier transform apparatus embodying the present invention for cases in which the imaginary term $jB(nT)$ can be neglected.

For the case where the imaginary part $jB(zT)$ of the input signal can be ignored, the register 10-2, adders 12-2, 13-5 and 13-6 and multipliers 13-1 and 13-4 can be omitted. The resulting block diagram for this situation where only the real part $A(zT)$ of the input signal is to be evaluated is shown in FIG. 4. As can be seen in FIG. 4, the outputs of the multiplier 13-2 and 13-3 are connected directly to the accumulators 15-1 and 15-2, respectively, and the addition networks 13-5 and 13-6 are omitted. The remainder of the connections in FIG. 4 for the real part of $A(zT)$ of the signal are the same as in FIG. 3.

The accumulators 15-1 and 15-2 may take on any suitable forms. For example, the accumulators may each include a shift register storage device and an adder (neither of which is shown). The shift register stores the Fourier coefficient from the previous sample time. The adder adds the new product of the reference value and the difference value to the stored value during each sample time and enters the result into the register in place of the previous Fourier coefficient.

In the digital discrete Fourier transform embodiments of this invention, the input signal $f(zT)$ and the reference signal $R(k\Omega zT)$ are, by definition, time quantized. In practice, these signals will also be amplitude quantized due to finite digital word lengths which are employed in practical digital processing apparatus. Amplitude quantization of the complex reference signal, of course, introduces deviation from the perfect sinusoidal shape. For design purposes, the amplitude quantization can be set at desired levels so as to simplify circuits and/or to suppress specific harmonics. Of course, the choice in each case must be balanced against the tolerable error in the discrete Fourier transform coefficients. The $R(k\Omega zT)$ source 14 may take on any suitable form. For example, the output of the look up table included in the digital frequency synthesizer described in our copending application Ser. No. 206,070 filed Dec. 8, 1971 for Modular Signal Processor may be employed.

What is claimed is:

1. Discrete Fourier transform apparatus comprising means for providing a stream of signal samples $f(zT)$, where T is the sampling interval in the time domain and $-\infty \leq z \leq \infty$;

storage means for delaying said $f(zT)$ signal samples for an interval NT, where N is the number of signal samples in the integration interval of the discrete Fourier transform of any sequence $f(nT)$ of said $f(zT)$ samples, where $z \leq n \leq z + N-1$;

arithmetic means coupled to receive said signal samples f(zT) and the delayed version thereof and arranged
1. for taking the differences between samples which are NT apart in time so as to provide a sequence of difference values; and
2. for multiplying said sequence of difference values by a sequence of complex reference values R($k\Omega zT$) for at least one value of $k$ to produce a resulting sequence of products; and means for accumulating said products to provide an updated Fourier coefficient value for each value of z.

2. The invention as set forth in claim 1 wherein said arithmetic means includes a first network for taking said differences and a second network for performing said multiplications.

3. The invention as set forth in claim 2 wherein said second network includes a first circuit for multiplying said difference values by the real part of the complex reference signal R($k\Omega zT$) to produce a resultant sequence of real products and a second circuit for multiplying said difference values by the imaginary part of the reference signal to produce a resulting sequence of imaginary products; and wherein said accumulating means includes first and second accumulators for accumulating said real and imaginary products, respectively.

4. The invention as set forth in claim 2 wherein said $f(zT)$ signal includes a real part A($zT$) and an imaginary part $j$B($zT$);

wherein said storage means includes first and second storage devices for delaying said A($zT$) and $j$B($zT$) signal parts, respectively, for the interval NT;

wherein said first network includes first and second circuits for taking the differences between the real and imaginary sample parts respectively, which are NT apart in time so as to produce a sequence of real and a sequence of imaginary values;

wherein said second network includes first and second complex multiplying circuits for multiplying said real and imaginary difference value sequences by the complex reference signal to produce a sequence of real and a sequence of imaginary products; and wherein said accumulating means includes first and second accumulators for accumulating said real and imaginary products, respectively.

* * * * *

UNITED STATES PATENT OFFICE
CERTIFICATE OF CORRECTION

Patent No. 3,778,606    Dated December 11, 1973

Inventor(s) Joseph W. Schmitt et al

It is certified that error appears in the above-identified patent and that said Letters Patent are hereby corrected as shown below:

Column 1, lines 30 and 31  $0 \leq n \quad N-1$ should be $0 \leq n \leq N-1$ column 2 line 66  $e^{-jk \, nT}$  should be  $e^{-jk\Omega \, nT}$ Signed and sealed this 10th day of September 1974.

(SEAL)
Attest:

McCOY M. GIBSON, JR.  
Attesting Officer

C. MARSHALL DANN  
Commissioner of Patents